United States Patent
Yamada et al.

(10) Patent No.: US 12,541,205 B2
(45) Date of Patent: Feb. 3, 2026

(54) MOVEMENT CONTROL SUPPORT DEVICE AND METHOD

(71) Applicant: Hitachi, Ltd., Tokyo (JP)

(72) Inventors: Hiroyuki Yamada, Tokyo (JP); Noriyasu Hasejima, Tokyo (JP); Go Sakayori, Tokyo (JP); Takehito Ogata, Tokyo (JP); Keiichi Katsuta, Tokyo (JP)

(73) Assignee: HITACHI, LTD., Tokyo (JP)

( * ) Notice: Subject to any disclaimer, the term of this patent is extended or adjusted under 35 U.S.C. 154(b) by 262 days.

(21) Appl. No.: 18/030,783

(22) PCT Filed: Oct. 12, 2021

(86) PCT No.: PCT/JP2021/037780
§ 371 (c)(1),
(2) Date: Apr. 7, 2023

(87) PCT Pub. No.: WO2022/113548
PCT Pub. Date: Jun. 2, 2022

(65) Prior Publication Data
US 2024/0019872 A1 Jan. 18, 2024

(30) Foreign Application Priority Data
Nov. 27, 2020 (JP) .................................. 2020-197027

(51) Int. Cl.
*G05D 1/00* (2024.01)
(52) U.S. Cl.
CPC .................................. *G05D 1/0297* (2013.01)

(58) Field of Classification Search
CPC ................................................... G05D 1/0297
See application file for complete search history.

(56) References Cited

U.S. PATENT DOCUMENTS 11,086,336 B1 * 8/2021 Bolotski .............. G05D 1/0212
2015/0308851 A1 10/2015 Morikawa et al.
(Continued)

FOREIGN PATENT DOCUMENTS

| JP | 2015-210083 A | 11/2015 |
| JP | 2019-219733 A | 12/2019 |

(Continued)

OTHER PUBLICATIONS

International Search Report of PCT/JP2021/037780 dated Dec. 28, 2021.

*Primary Examiner* — Wade Miles
*Assistant Examiner* — Aaron G Cain
(74) *Attorney, Agent, or Firm* — MATTINGLY & MALUR, PC

(57) ABSTRACT

The present invention addresses the problem of efficiently moving a plurality of moving objects under different rule-based control systems without impairing safety. In order to solve this problem, a moving body task estimation unit 501 estimates moving body tasks 541 of a plurality of moving bodies 1 under different rule-based control systems, an optimum route generation unit 503 searches for optimum routes 542 using various combinations of a plurality of pieces of task information, and a common movement route creation unit 504 creates a common movement route 543 for the plurality of moving bodies by overlapping the obtained optimum routes 542.

10 Claims, 11 Drawing Sheets

(56) References Cited

U.S. PATENT DOCUMENTS

| | | | |
|---|---|---|---|
| 2019/0381661 A1* | 12/2019 | Taira | ........................ B25J 5/007 |
| 2019/0384307 A1 | 12/2019 | Toyota et al. | |
| 2020/0103921 A1* | 4/2020 | Voorhies | .............. G05D 1/0291 |
| 2020/0254999 A1 | 8/2020 | Sugano et al. | |

FOREIGN PATENT DOCUMENTS

| | | |
|---|---|---|
| JP | 2019-219735 A | 12/2019 |
| JP | 2020-129260 A | 8/2020 |
| WO | 2002/023297 A1 | 3/2002 |

\* cited by examiner (a)

(b)

541'

| Task No. | Path1 (x,y) | Path2 (x,y) | Path3 (x,y) | ... |
|---|---|---|---|---|
| 1 | (0,0) | (0,1) | (0,2) | ... |
| 2 | (5,5) | (5,4) | (5,3) | ... |
| 3 | (0,0) | (0,1) | (0,2) | ... |
| 4 | (4,5) | (5,5) | (5,4) | ... |
| 5 | (0,0) | (0,1) | (0,2) | ... |
| ⋮ | ⋮ | ⋮ | ⋮ | |

FIG. 11
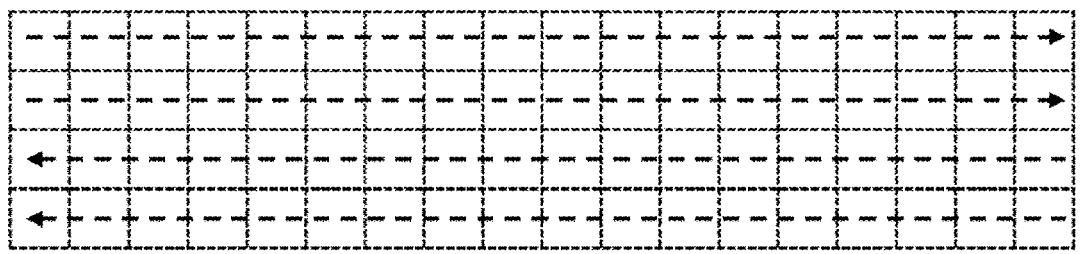
RULE OF SYSTEM C (LEFT-SIDE DRIVING ON TWO LANES ON EACH SIDE / LANE CHANGE IS OMITTED)
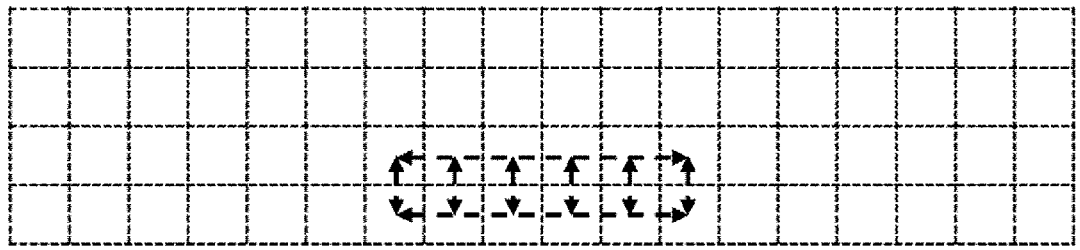
RULE OF SYSTEM D (FREELY MOVING IN CONSTRUCTION SECTION)
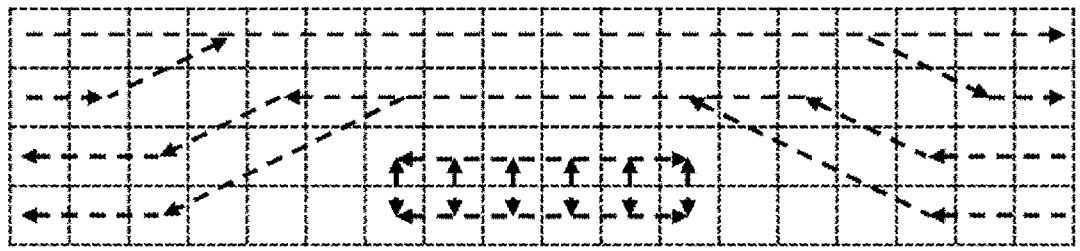
COMMON MOVEMENT ROUTE

MOVEMENT CONTROL SUPPORT DEVICE AND METHOD

TECHNICAL FIELD

The present invention relates to a technique for controlling movement of a plurality of moving bodies under different rule-based control systems. That is, the present invention relates to control of moving bodies in a plurality of systems. In particular, the present invention relates to a technique for supporting control on a moving body.

BACKGROUND ART

In recent years, development of an automation system that automates human work to achieve labor saving and efficiency has been actively conducted, and many automation systems are expected to be implemented in society in the future. In the automation systems, a moving body is controlled to realize the work. Among these automation systems, in particular, automated driving of an automobile, an industrial vehicle, a construction machine, or the like automates a task involving movement, and thus, is assumed to be mounted in a wide range of environments and operated under a condition that a plurality of automation systems are present in the same space in a mixed manner.

Here, the respective automation systems have mutually different purposes and execute different tasks, and there is a possibility that cooperation between the systems is not sufficiently achieved or the cooperation is hardly achieved. For example, assuming a scene where repair work is performed on a part of a road, a construction machine group that performs the work is controlled by an automated construction system, and an action is planned based on a rule determined by the automated construction system, and construction is automatically performed. In addition, an autonomous vehicle travels on the road in parallel, and an automated driving system travels in the vicinity of a construction area on the road without knowing rules and control characteristics of the automated construction system.

At this time, the automated construction system and the automated driving system share a construction section on the road and a peripheral area thereof. In a common area, both the systems can recognize the presence of each other by an object detection technique or the like, but do not know what kind of action is being performed for what kind of purpose. For this reason, it is necessary to take a very conservative action, such as lowering the speed to the extreme degree, from the viewpoint of safety, and effects may be reduced as compared with human work from the viewpoint of productivity of efficiently executing tasks.

Here, if an automation system is small, not complicated, and limited to a limited space, it is sometimes possible to obtain the maximum efficiency without impairing safety by integrating a plurality of the systems in advance. However, if a large number of automation systems are implemented in a wide range, it is practically impossible to integrate the systems into one. In such a social background, it has been important to provide a mechanism for setting movement as a basic task, intervening between a plurality of automation systems under different rule-based control systems, and making the systems respect each other and coexist. In particular, automation systems each having movement as a basic task, such as an automobile and an industrial vehicle, are not easy to integrate, and have a high safety risk, and thus, there is a high need for cooperation between the systems. In addition, even if automation systems are small and not complicated, there are also a case where integration is difficult and a case where the need for cooperation between the systems is high.

In addition, the automation system having movement as a basic task is controlled to plan a movement route from a current position to a goal position which is an object of the task and to move along the route. In the route planning, there is a case where the route is set in consideration of environmental conditions according to a rule of each of the systems. The rule refers to, for example, requirements such as some waypoints, which are candidates for the route, places where traveling is permitted or places where traveling is prohibited, and conditions under which traveling is permitted or conditions under which traveling is prohibited. In addition, movement of the plurality of automation systems based on different rules in the same area corresponds to traveling on different virtual roads in the same area. In this case, a conservative control design is made in order to lower the safety risk as described above, which may cause a decrease in productivity. For this reason, it is important, as a first step, to have a common rule between the systems, that is, a common virtual route map in a common area where the plurality of automation systems each having movement as a basic task are present in a mixed manner.

PTL 1 relates to a moving body movement control system capable of smoothly controlling movement of a plurality of moving bodies without performing enormous calculation. That is, PTL 1 discloses that a position of a moving body is grasped by a camera installed in an environment to set a travel route to a destination, and a restriction passage that restricts a travel order or restricts a travel direction is arranged in order to ensure smooth travel.

CITATION LIST

Patent Literature

PTL 1: WO 2002/023297 A

SUMMARY OF INVENTION

Technical Problem

In the moving body control system of PTL 1, a plurality of mobile robots simultaneously move in one area, and the restriction passage is arranged to prevent the mobile robots from colliding with each other. However, these mobile robots adopt a single system, and are not placed under different rule-based control systems such that actions are planned based on different rules.

For this reason, in the case of creating a virtual route map that is a common rule for a plurality of moving bodies whose actions are planned based on different rules in PTL 1, there are the following problems. In PTL 1, it is necessary to respect a rule of each of systems as much as possible and to minimize a change in a planned action accompanying a change in the rule for all systems. This is because, in an area where only a single system acts, outside the common area, a rule of this system is applied as it is to perform an action, and it is not desirable that the action greatly changes between the inside and the outside of the common area.

As described above, it is difficult to perform control for causing moving bodies in different systems to function in PTL 1. For example, it is difficult to maintain or improve safety and productivity by controlling the moving bodies.

Solution to Problem

In order to solve the above problems, in the present invention, a rule, related to movement of moving bodies in a plurality of system in a common area where the moving bodies are present in a mixed manner, is created. Here, the rule includes a common movement route that is a route of the moving bodies.

More specifically, provided is a movement control support device that supports control on movement of moving bodies in a plurality of systems in a common area where the moving bodies are present in a mixed manner, the movement control support device including: a moving body task estimation unit that estimates moving body tasks of the moving bodies based on movement positions of each of the moving bodies; an individual rule generation unit that generates individual rules for realizing the moving body tasks for each of the moving body tasks; and a common area rule creation unit that identifies an overlapping situation of the individual rules in the common area, and creates a common area rule related to the movement of the moving bodies in the common area using each of the individual rules according to the overlapping situation.

One aspect of the present invention also includes a movement control support method using the movement control support device. Note that the present method also includes a processing method in the movement control support device. Further, a computer program for causing the movement control support device to function as a computer and a storage medium storing the program are also included in one aspect of the present invention.

Advantageous Effects of Invention

According to the present invention, the efficient movement in the common area is enabled while maintaining safety and suppressing a width of change in each of rules regarding control of the plurality of moving bodies under different rule-based control systems.

FIG. is an overall view of a control system in a third embodiment.

FIG. 11 is a view illustrating rules in a plurality of systems and a concept of a common movement route in the third embodiment.

Figure 12:
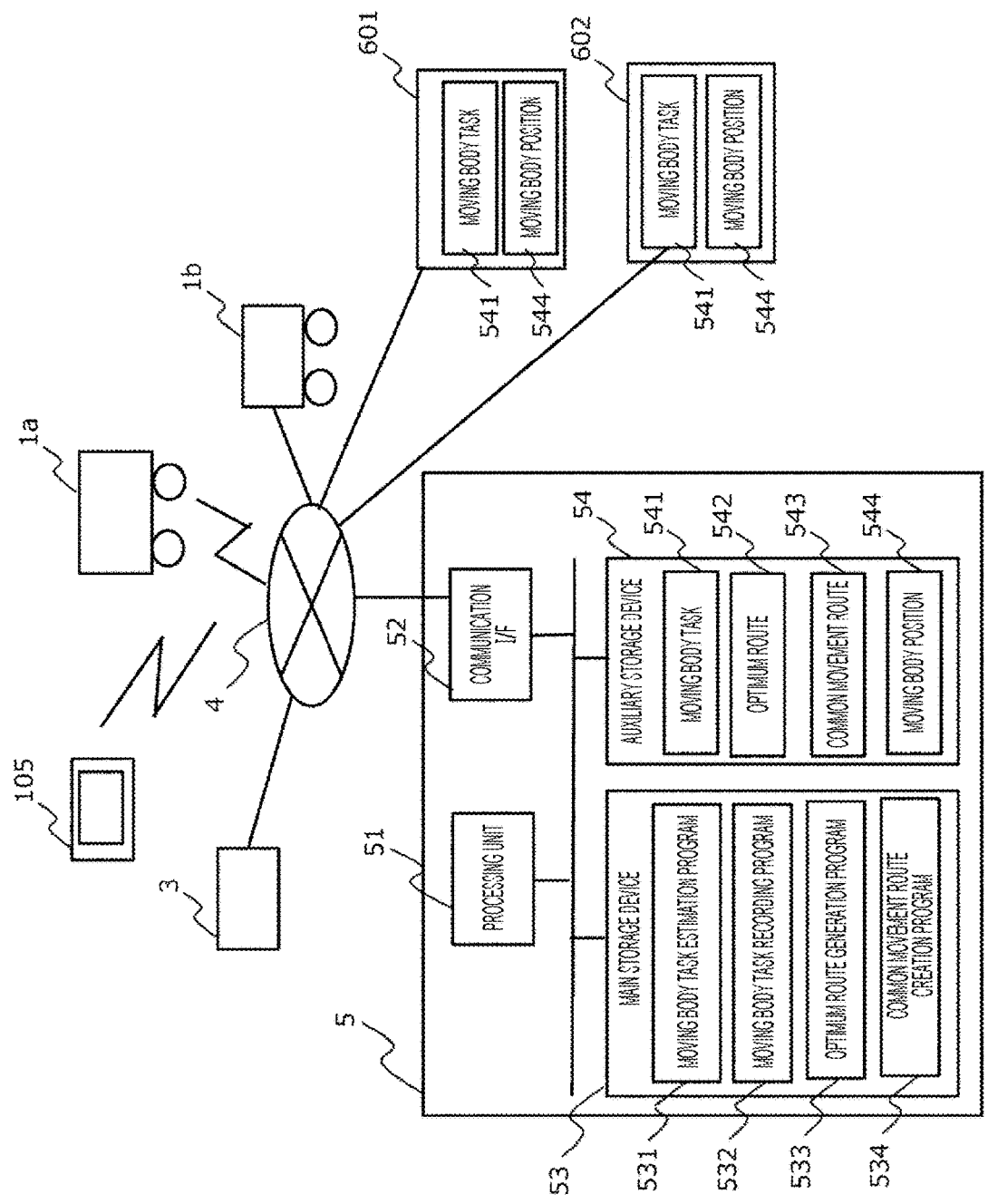

FIG. 12 is a hardware configuration diagram of the control system in each embodiment.

DESCRIPTION OF EMBODIMENTS

Hereinafter, embodiments (a first embodiment to a third embodiment) of the present invention will be described with reference to the drawings and the like.

The following descriptions illustrate specific examples of the content of the present invention. The present invention is not limited to these descriptions, and various changes and modifications by those skilled in the art can be made within the scope of the technical idea disclosed in the present specification. In addition, the same reference sign will be attached to those having the same function in the entire drawing for describing the present invention, and the repetitive description thereof will be omitted in some cases.

In addition, it is sufficient for a "moving body" in the specification of the present application to be one having a moving function. This movement may be performed autonomously by the moving body or may be performed according to control from a system. Further, the movement of the moving body may employ hybrid control, that is, both the autonomous control and the control from the system. In this manner, not all the moving bodies are necessarily under the control of the control system in each of the embodiments.

First Embodiment

First, a control system for a plurality of moving bodies in the first embodiment will be described with reference to FIGS. 1 to 8.

Figure 1:
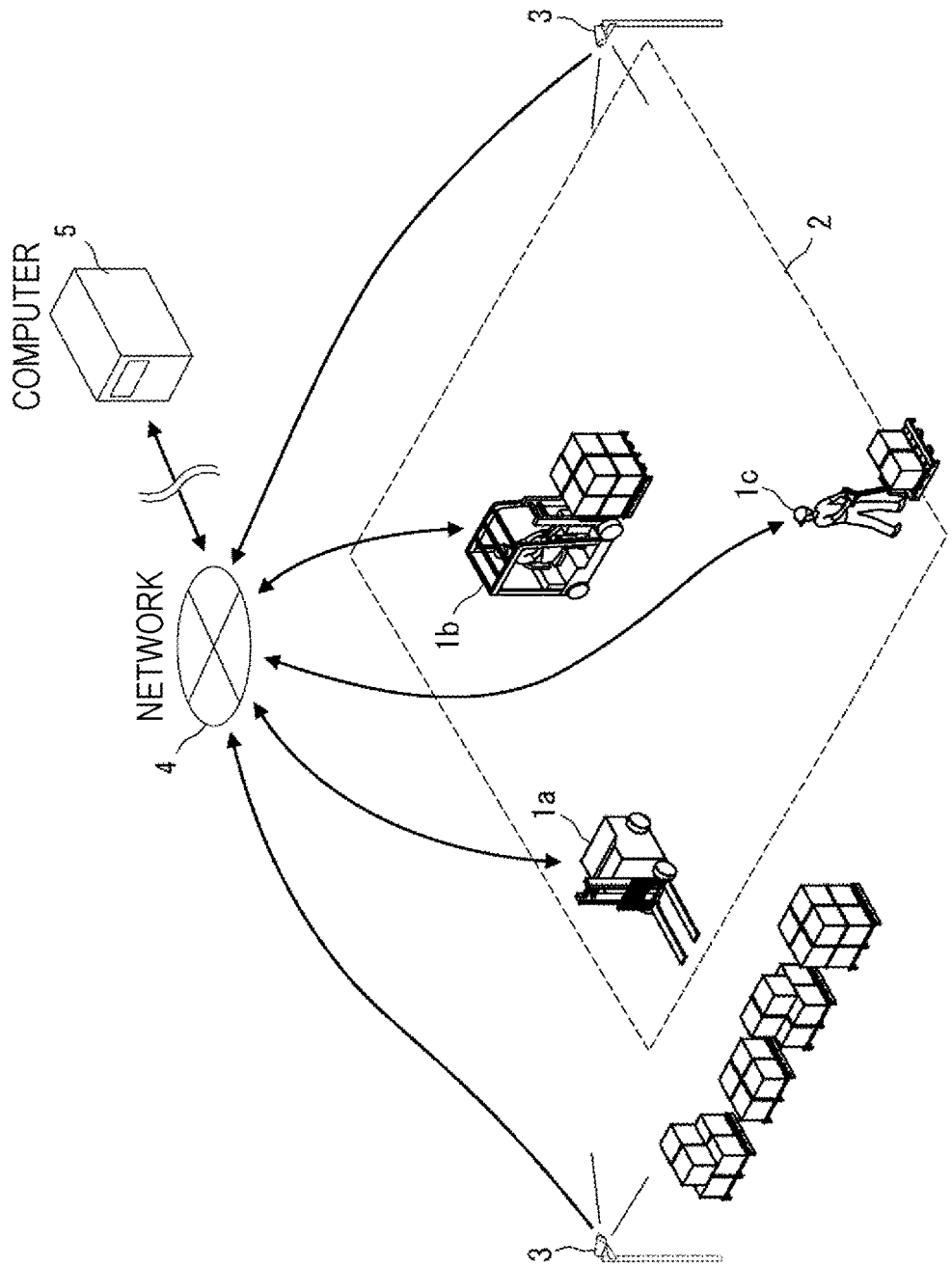
FIG. 1 is an overall diagram of a control system in a first embodiment.

FIG. 1 is an overall diagram illustrating a configuration of the control system for the plurality of moving bodies in the present embodiment. This control system includes one or a plurality of environment sensors 3, a network 4, and one or a plurality of computers 5. Then, the environment sensor 3 and the computer 5 are connected to be capable of communicating with each other via the network 4.

In addition, a plurality of moving bodies 1 are present as control targets of the control system, and a common area 2 is present as a target area. The moving bodies 1 can be subdivided into, for example, an unmanned machine 1a having an autonomous movement function and moving in an unmanned manner, a manned machine 1b moving under manipulation by a person, a worker 1c, and the like. In the present embodiment, assumed is an environment in which both of two different systems (a truck loading and unloading system A and a warehouse management system system B) execute moving body tasks in the common area 2. That is, the moving bodies in the different systems are present in a mixed manner in the common area 2. In the present embodiment, the system A is the truck loading and unloading system A that controls the unmanned machine 1a such that a load is unloaded from a truck in an unmanned manner and moved to a temporary storage place.

In addition, the system B is the warehouse management system B that controls the manned machine 1b and the worker 1c such that the worker inspects the cargo placed in the temporary storage place, and the manned machine transports the inspected cargo to a warehouse. Note that each or both of the truck loading and unloading system A and the warehouse management system B are referred to as the moving body systems. In addition, the entire common area 2 is the temporary storage place. Further, the unmanned machine 1a and the manned machine 1b include a cargo handling vehicle such as a so-called forklift as illustrated in the drawing.

Figure 2:
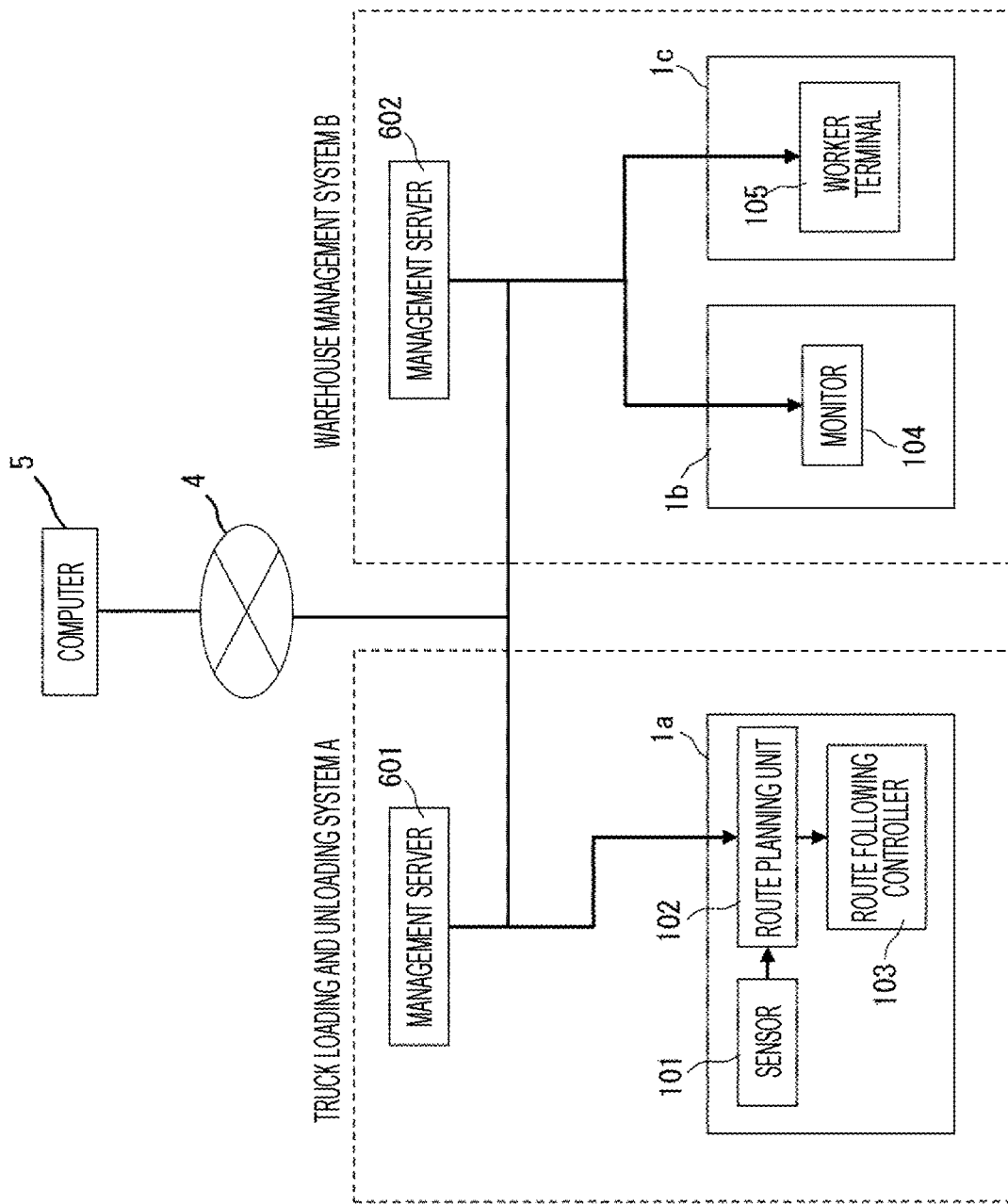
FIG. 2 is a functional configuration diagram of a moving body system in the first embodiment.

Next, FIG. 2 is a functional configuration diagram of the moving body system in the present embodiment. The truck loading and unloading system A mainly includes a management server 601, one or a plurality of the unmanned machines 1a, and a truck (not illustrated). Then, the management server 601 of the truck loading and unloading system A manages the operation of the truck and a moving body which is a task of the unmanned machine 1a. More specifically, when the truck arrives at a truck berth near the temporary storage place, the management server 601 first issues the moving body task to the unmanned machine 1a.

Examples of the moving body task include information on a position of the truck and the load and information instructing an unloading place in the temporary storage place and a global movement route therebetween. Then, when receiving its own moving body task, the unmanned machine 1a first moves to a start position (hereinafter, start point (truck position)) at which the moving body task is started. Next, the unmanned machine 1a lifts the load and moves the load to an arrival position (hereinafter, goal point (unloading place)) at which the moving body task is completed along the global movement route indicated by the moving body task. Then, the unmanned machine 1a unloads the cargo to the temporary storage place.

Note that the global movement route may have any name as long as being information for controlling movement in the common area 2.

At this time, the unmanned machine 1a observes surrounding obstacles and other moving bodies by one or a plurality of sensors 101 mounted on its own machine, and plans a local movement route using a route planning unit 102 so as not to collide with the obstacles and moving bodies. Then, the unmanned machine 1a controls an actuator (not illustrated) so as to follow the local movement route using a route following controller 103.

Here, a difference between the global movement route and the local movement route is that the global movement route planned by the management server 601 is an ideal route obtained without considering positions of the obstacles and moving bodies, and the local movement route is a route obtained by further adjusting the global movement route to avoid the surrounding obstacles and moving bodies.

In this manner, the truck loading and unloading system A causes the load of the truck to be moved to the temporary storage place autonomously by the management server 601 and the unmanned machine 1a. As described above, in the present embodiment, note that the truck loading and unloading system A manages the operation of the truck independently of the warehouse side, but the present embodiment relates to the common area 2 of the plurality of systems. That is, the operation of the truck is not directly related to the present embodiment, and thus, the illustration and description thereof are omitted.

In addition, the warehouse management system B mainly includes a management server 602, one or a plurality of the manned machines 1b, and one or a plurality of the workers 1c. Then, the management server 602 gives an instruction (guidance) to an operator of the manned machine 1b or the worker 1c to perform work (task), thereby efficiently transporting a cargo from the temporary storage place to the warehouse.

The manned machine 1b is provided with a monitor 104 such that the content of an instruction of a moving body task (a position of the cargo to be transported, a transport destination position in the warehouse, and a global movement route therebetween) from the management server 602 are displayed. The operator of the manned machine 1b executes the moving body task according to the instruction of the moving body task displayed on the monitor 104. Specifically, movement from a current location to a start point (the position of the cargo), lifting of the cargo, movement from the start point to a goal point (the transport destination of the cargo), and an unloading operation are performed. Then, when a series of moving body tasks is completed, the work is repeated according to the next moving body task instruction.

The worker 1c holds a worker terminal 105 on which the content of an instruction of a moving body task (a position of a cargo to be inspected and a global movement route to the position) from the management server 602 is presented. The worker 1c moves from a current location to a goal point (the position of the cargo) according to the instruction of the moving body task displayed on the worker terminal 105 and performs cargo inspection work. Then, the worker 1c repeats the work according to the next moving body task instruction when its own moving body task is completed. The operator of the manned machine 1b or the worker 1c visually observes positions of obstacles and other moving bodies during the movement, and moves so as not to collide. In this manner, a person (the worker 1c) is also included in the control targets in the present embodiment.

In addition, each of the moving body systems is connected to the computer 5 via the network 4 as illustrated in FIG. 2. Note that the computer 5 will be described later.

The present embodiment assumes a case where the truck loading and unloading system A and the warehouse management system B are independent systems, and sharing of sensitive information therebetween and cooperation of the systems are not performed. However, information of the other system is acquired in a case where the unmanned machine 1a measures positions of the manned machine 1b and the worker 1c with the sensor 101, in a case where the operator of the manned machine 1b or the worker 1c visually captures a position of the unmanned machine 1a, and the like. When the two systems execute moving body tasks in parallel in the common area 2 in such an environment, the unmanned machine 1a, for example, needs to act so as not to collide with the manned machine 1b and the worker 1c.

However, even if current locations of the manned machine 1b and the worker 1c have been successfully observed, it is not easy to grasp where the manned machine 1b and the worker 1c move next, and thus, it is necessary to plan the local movement route assuming movement in all possible directions. For this reason, a moving body task completion time is extended by slowly performing the operation or avoiding the moving bodies with a roundabout way, so that the work efficiency decreases.

Here, it is also difficult for the manned machine 1b and the worker 1c to predict how the unmanned machine 1a operates. For this reason, when the unmanned machine 1a is near, the manned machine 1b and the worker 1c need to continuously observe an action of the unmanned machine 1a and perform an action with a sufficient safety margin such as deceleration, stop, and avoidance, so that the work efficiency decreases. In the environment in which the plurality of systems are present in a mixed manner in this manner, that is, an environment such as the common area 2, a safety risk increases if mutual behaviors of the systems are not predictable, and there is no choice but to perform an action at the expense of the work efficiency in order to lower the risk to an allowable level.

Therefore, each of the systems performs an action according to each of rules (system settings or agreements), but operational problems such as a collision or an abnormal approach between the moving bodies occur when the rules are not shared between the systems. The rules in the plurality of systems and a concept of a common movement route will be described with reference to FIG. 3.

First, as a premise, each of FIGS. 3(a) to 3(c) illustrates the common area 2 in the first embodiment. Then, each of the common areas 2 is divided into a lattice shape (matrix shape) by grids. Then, in FIG. 3(a), a basic movement rule of the truck loading and unloading system A indicates moving counterclockwise in the temporary storage place. In addition, a basic movement rule of the warehouse management system B indicates moving to a destination along the shortest route.

Figure 3:
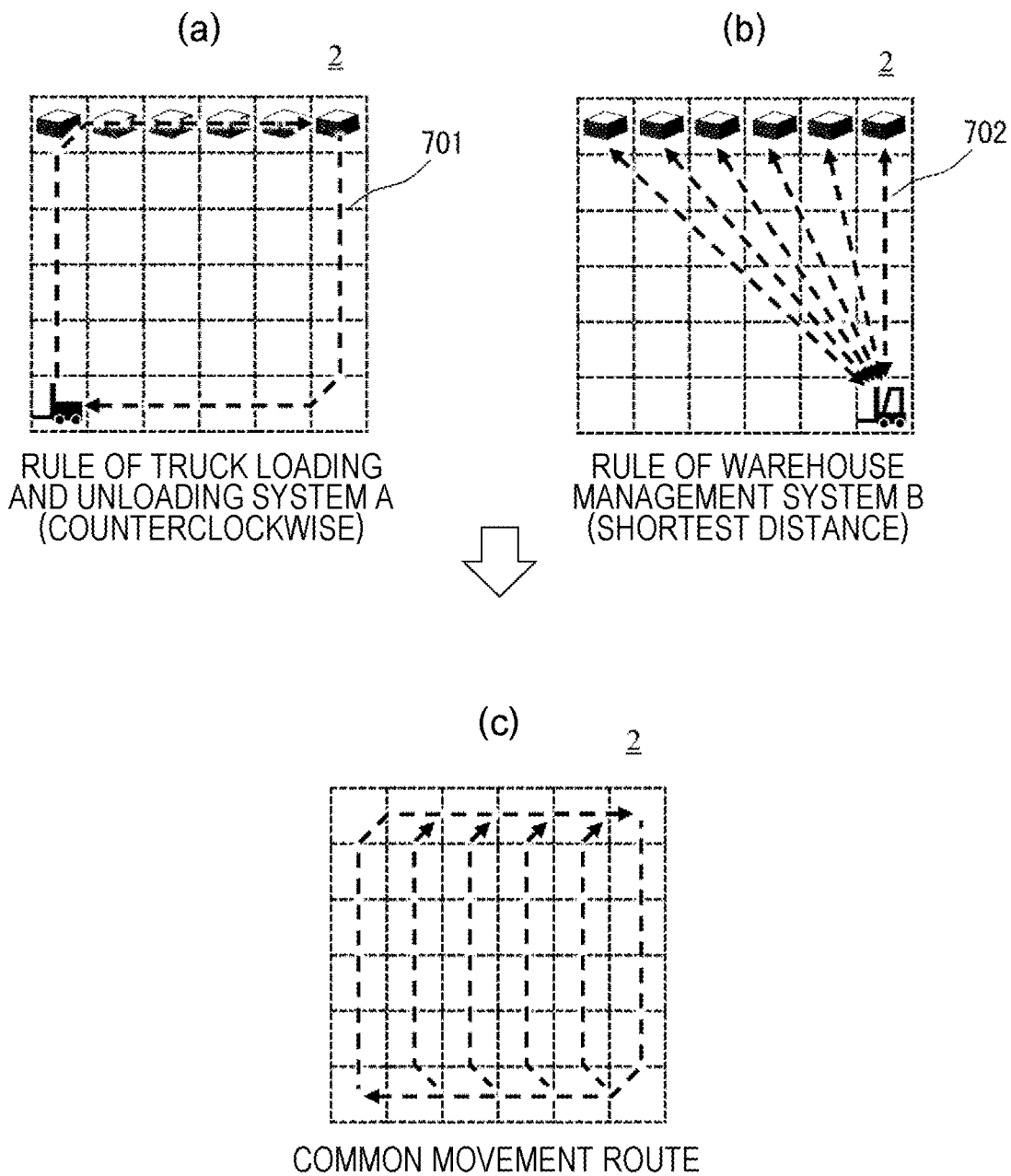
FIG. 3 is a view illustrating rules in a plurality of systems and a concept of a common movement route in the first embodiment.

At this time, a part (a route 702 in FIG. 3 (b)) of movement routes that can be taken by the warehouse management system B overlaps with a movement route (a route 701 in FIG. 3 (a)) of the truck loading and unloading system A. That is, the grids partially overlap. Then, movement directions of the respective moving bodies are diametrically opposite. For this reason, one or both of the moving bodies need to take measures such as deceleration, stop, and detouring in order to avoid a head-on collision, so that the moving body task completion time is extended. Therefore, the common movement route as a common rule is created for the plurality of moving bodies under management of different rule-based systems in the present embodiment. As a result, it is possible to cause each of the systems to act according to the common movement route and to easily predict an action of the moving body of another system, it is possible to shorten the moving body task completion time while maintaining safety to prevent the decrease in the work efficiency.

Here, a common movement route illustrated in FIG. 3(c) is an example of the common movement route for the truck loading and unloading system A and the warehouse management system B in the present embodiment. The common movement route focuses on, for example, the warehouse management system B and identifies a grid overlapping with the route of the truck loading and unloading system A. Then, a route of the warehouse management system B on a grid in which the number of overlaps is equal to or less than a certain value (for example, there is no overlap) is deleted. Then, a route that complements the moving body task realized by the route of the truck loading and unloading system A and the deleted route of the warehouse management system B is added to create the common movement route illustrated in FIG. 3(c). Details of this procedure will be described later. In addition, processing is performed in units of lattice-shaped grids in the present embodiment, but other position information such as latitude and longitude information may be used. Note that the grids are used to achieve simplification of calculation and labor saving in the processing.

Next, a configuration of each device of control systems according to the present embodiment and the second and third embodiments will be described with reference to FIGS. 4 and 12. In each of the embodiments, this configuration is used to create a common movement route for smooth and efficient movement without impairing safety when a plurality of moving bodies under different rule-based control systems (under system management) move in a common area. In addition, control or guidance is performed such that each of the systems behaves according to the created common movement route in each of the embodiments.

Figure 4:
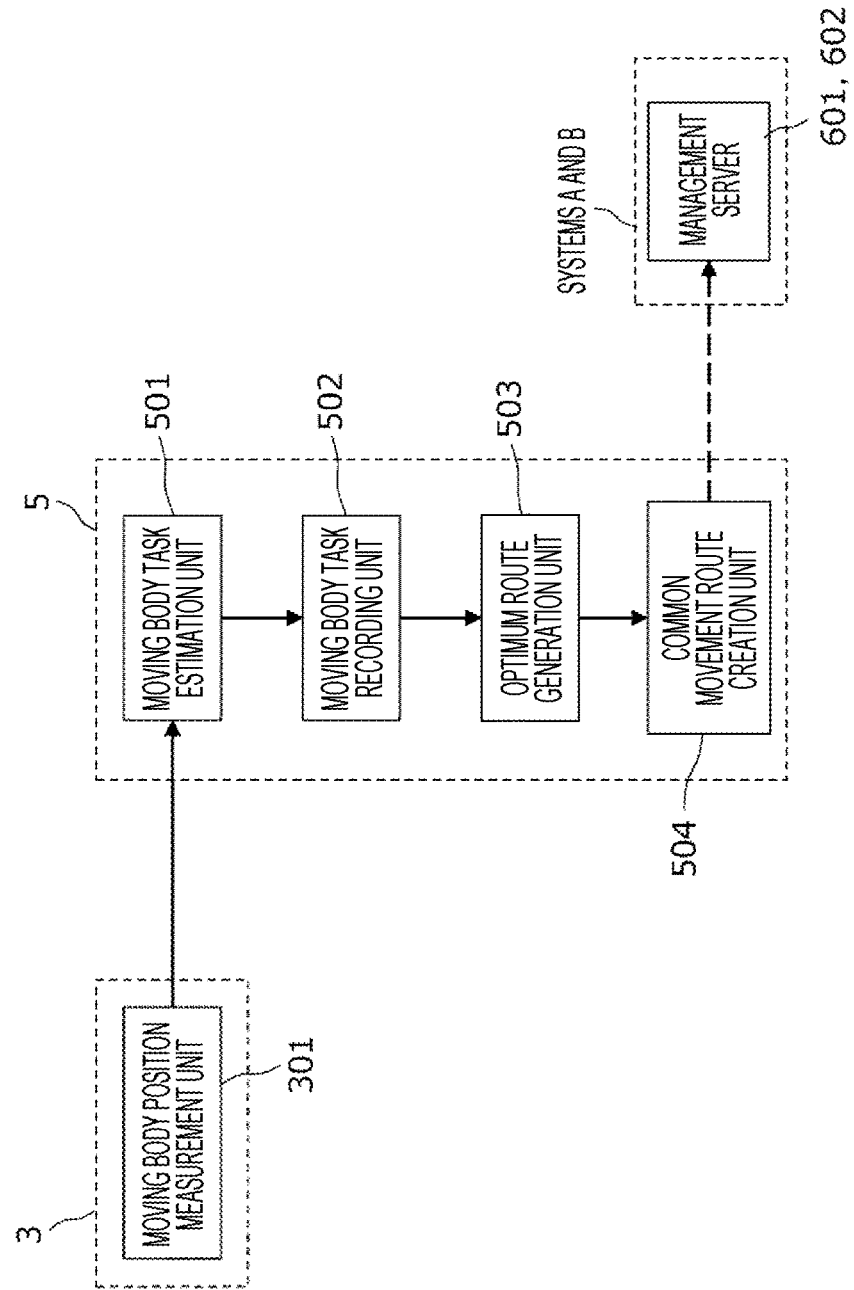
FIG. 4 is a functional block diagram illustrating functions of an environment sensor and a computer in each embodiment.

First, FIG. 4 is a functional block diagram illustrating functions of the environment sensor 3 and the computer 5 in each of the embodiments. The functions of the respective devices illustrated in FIG. 4 are roughly divided into a function executed by the environment sensor 3 and functions executed by the computer 5. The environment sensor 3 includes a moving body position measurement unit 301 that measures positions of the moving bodies 1, measures moving body positions, and transmits results thereof to the computer 5 via the network 4.

The computer 5 includes a moving body task estimation unit 501, a moving body task recording unit 502, an optimum route generation unit 503, and a common movement route creation unit 504. First, the computer 5 receives the measurement results of the moving body positions from the environment sensor 3. Then, the moving body task estimation unit 501 estimates moving body tasks of the moving bodies from received time-series moving body position information. Note that the moving body task estimation unit 501 may estimate the moving body tasks based on pieces of moving body position information included in the management servers 601 and 602, instead of the measurement results of the environment sensor 3, as will be described later.

In addition, the moving body task recording unit 502 records the estimated moving body tasks in an auxiliary storage device 54 to be described later. Then, the optimum route generation unit 503 generates optimum routes respectively for the moving bodies using pieces of recorded task information included in a plurality of the moving body tasks.

In addition, the common movement route creation unit 504 creates the common movement route based on the plurality of optimum routes. Here, the common movement route created by the computer 5 is sent to the management servers (601 and 602) of the respective systems and used for planning of global movement routes.

Next, FIG. 12 illustrates a hardware configuration diagram of the control system in each of the embodiments. As illustrated in FIGS. 1 and 2, the control system includes the unmanned machine 1a, the manned machine 1b, the environment sensor 3, the network 4, the management server 601, and the management server 602. Here, the worker terminal 105 held by the worker 1c is described as a hardware configuration in FIG. 12.

Then, these devices are connected via the network 4. Here, the unmanned machine 1a and the worker terminal 105 are wirelessly connected to the network 4, and the others are connected in a wired manner Note that this example is merely an example, and it is sufficient for each of the devices to be connected to the network 4 regardless of being wired or wireless. In addition, FIG. 12 illustrates one unmanned machine 1a, one manned machine 1b, one environment sensor 3, and one worker terminal 105, but a plurality of the unmanned machines 1a, a plurality of the manned machines 1b, a plurality of the environment sensors 3, and a plurality of the worker terminals 105 may be present.

Here, the computer 5 is configured to perform main processing in each of the embodiments, and functions as a movement control support device for a plurality of moving bodies. In addition, the computer 5 is realized by a so-called server, a cloud, or the like. For this reason, the computer 5 includes a processing unit 51, a communication I/F 52, a main storage device 53, and an auxiliary storage device 54 which are connected to each other via a communication path such as a bus.

Here, the processing unit 51 is realized by a processor such as a CPU, and executes each processing, which will be described later, according to a program of the main storage device 53. The communication I/F 52 performs communication via the network 4.

In addition, the main storage device 53 is realized by a memory or the like, and the following programs are developed.

A moving body task estimation program 531, a moving body task recording program 532, an optimum route generation program 533, and a common movement route creation program 534 are developed in the main storage device 53. These programs are stored in the auxiliary storage device 54 or another storage medium, and are developed in the main storage device 53 when the processing unit 51 performs processing. In addition, these programs may be distributed to the computer 5 via the network 4.

Here, each of the programs can be also realized by a hardware configuration such as a circuit, and has the following correspondence with each of the units illustrated in FIG. 4.

Moving body task estimation program 531: moving body task estimation unit 501

Moving body task recording program 532: moving body task recording unit 502

Optimum route generation program 533: optimum route generation unit 503

Common movement route creation program 534: common movement route creation unit 504

Next, the auxiliary storage device 54 is realized by a storage device such as a hard disk drive (HDD) or a solid state drive (SSD), and stores a moving body task 541, an optimum route 542, and a common movement route 543. Note that the auxiliary storage device 54 desirably stores each of the programs as described above.

In addition, each of the management servers (601 and 602) desirably stores the moving body task 541 and a moving body position 544 of the moving body managed by the management server itself.

Note that the computer 5 may further include an input/output device such as a keyboard, a mouse, a display device, or a touch panel.

Next, the content of the processing of the present embodiment will be described with reference to FIGS. 5, 6, and 7. Note that the description will be given using each of the units in FIG. 4 as a subject of the processing in the following description, but the processing unit 51 similarly performs the processing according to each of the programs illustrated in FIG. 12. In addition, in a case where the configuration illustrated only in FIG. 12 is used at this time, the configuration illustrated in FIG. 12 will also be appropriately used for description.

Figure 5:
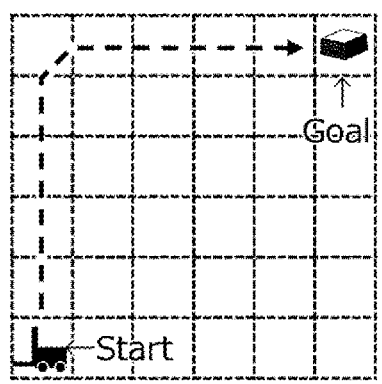
FIG. 5 is a view illustrating a moving body task in the first embodiment.

FIG. 5 illustrates an example of the moving body task 541 estimated by the moving body task estimation unit 501. In the present embodiment, an object is to control movement of a moving body, and a basic task is moving from a position "Start" that is a start point to "Goal" that is another goal point aiming at the object as illustrated in FIG. 5(*a*). In this basic task, for example, moving from "Start" that is a current place to "Goal" that is a place where a cargo is placed can be defined as one task (movement task), and lifting up the cargo and moving to another unloading place can be defined as another task (cargo handling task). The moving body task 541 indicating these basic tasks can specify a start point and a goal point as minimum components. For this reason, when a series of work of the moving body 1 is decomposed into tasks and arranged in a time-series order, it can be expressed as a table illustrated in FIG. 5(*b*). That is, FIG. 5(*b*) illustrates the moving body task 541.

Figure 6:
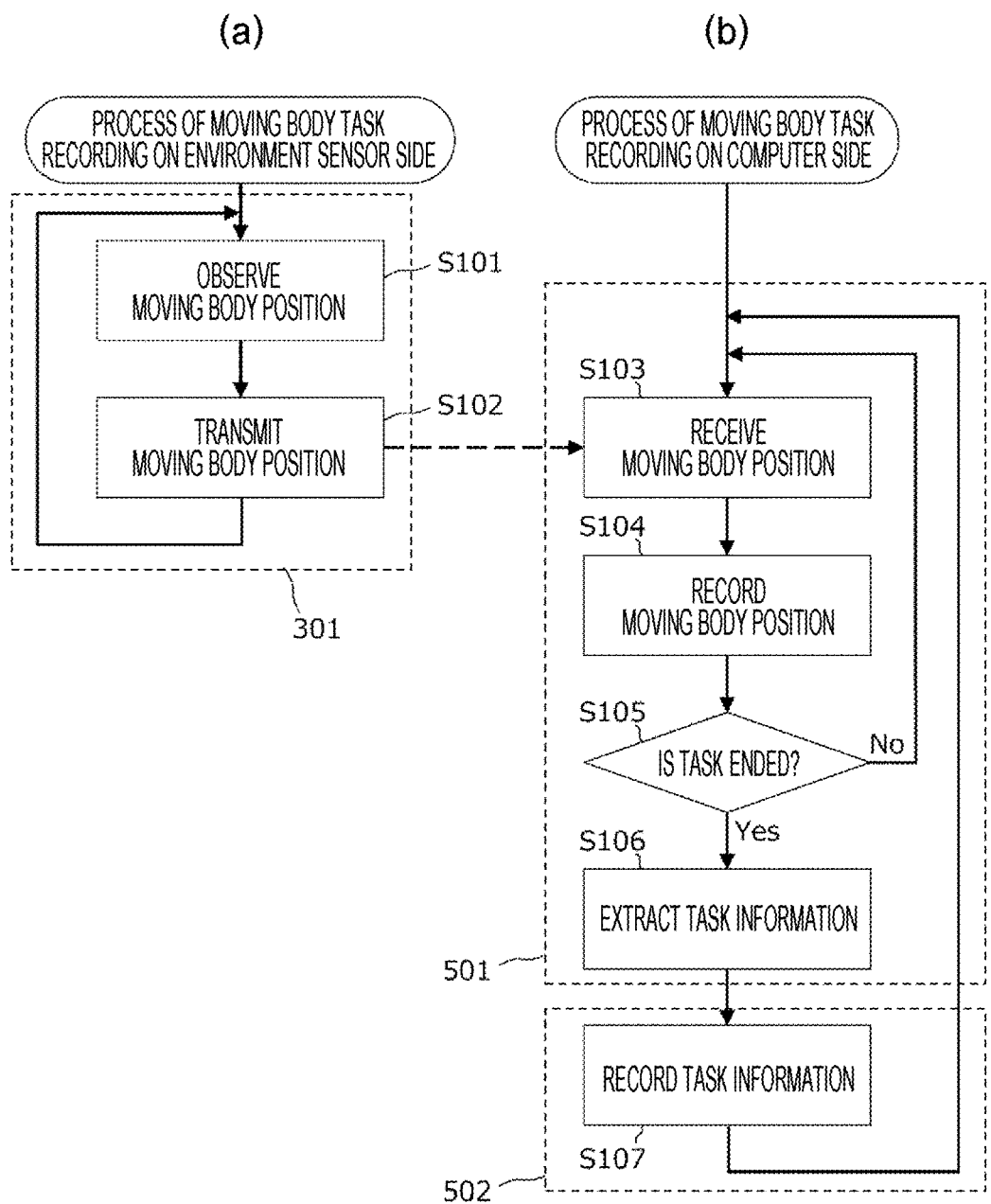
FIG. 6 is a flowchart illustrating a process for recording a moving body task in each embodiment.

Next, FIG. 6 is a flowchart illustrating a process for recording a moving body task.

Here, FIG. 6(*a*) is a flowchart illustrating a process of moving body task recording on the environment sensor side. In this moving body task recording process, first, the moving body position measurement unit 301 of the environment sensor 3 is executed. First, in step S101, the moving body position measurement unit 301 measures positions (x and y coordinates in the present embodiment) of one or a plurality of moving bodies in the common area 2. Then, in step S102, the moving body position measurement unit 301 transmits the moving body positions measured in step S101 to the computer 5 via the network 4.

Note that the moving body position is measured using the environment sensor 3 in the present embodiment, but a self-position may be acquired from each of the moving bodies if each of the moving bodies as control targets has a self-position estimation function.

In this case, a sensor for self-position estimation mounted on each of the moving bodies serves as a substitute for the environment sensor 3. In addition, the computer 5 may identify the moving body position using the moving body position 544 included in the global movement route held by each of the management servers (601 and 602).

Next, a process of moving body task recording on the computer side illustrated in FIG. 6(*b*) will be described. First, in step S103, the moving body task estimation unit 501 of the computer 5 receives the moving body position 544 received from the environment sensor 3 via the communication I/F 52. As the moving body position 544, a grid on which the moving body is moving can be used. However, other position information such as latitude and longitude may be used as the moving body position as described above.

Next, in step S104, the moving body task estimation unit 501 records the moving body position 544 in time series in a storage area inside the computer 5, for example, the auxiliary storage device 54.

Next, in step S105, the moving body task estimation unit 501 determines whether or not a series of the moving body tasks 541 in the corresponding moving body is completed from the recorded time-series moving body position information. Regarding this determination, for example, there is a method of determining that the moving body task 541 is ended when the moving body 1 remains at the same position for a certain period of time. In addition, there is also a method of receiving a global movement route from the management server 601 or 602, and determining that the corresponding moving body task 541 is ended when the moving body 1 arrives at a start point and a goal point of the global movement route.

Here, in a case where it is determined in step S105 that the moving body task has not been ended yet (No), steps S103 and S104 are repeated. When it is determined that the moving body task 541 has been ended (Yes), the process proceeds to step S106.

Then, in step S106, the moving body task estimation unit 501 extracts task information of the moving body task 541 determined to be ended. In the present embodiment, the moving body task 541 is represented by two pieces of position information of the start point and the goal point as illustrated in FIG. 5. For this reason, in step S106, the task information is extracted with the first position in a time-axis direction of a series of time-series information as the start point and the last position as the goal point. That is, each record of the moving body task 541 illustrated in FIG. 5 indicates the task information. In this manner, the moving body task estimation unit 501 can acquire the task information of the moving body.

Next, in step S107, the moving body task recording unit 502 records the acquired task information in the storage area inside the computer 5 such as the auxiliary storage device 54. Here, in step S107, a unique set of a task number, a start point, and a goal point is recorded for each of the moving bodies as illustrated in FIG. 5. The above is the processing content of the moving body task recording process.

Note that Step S107 may be omitted.

Figure 7:
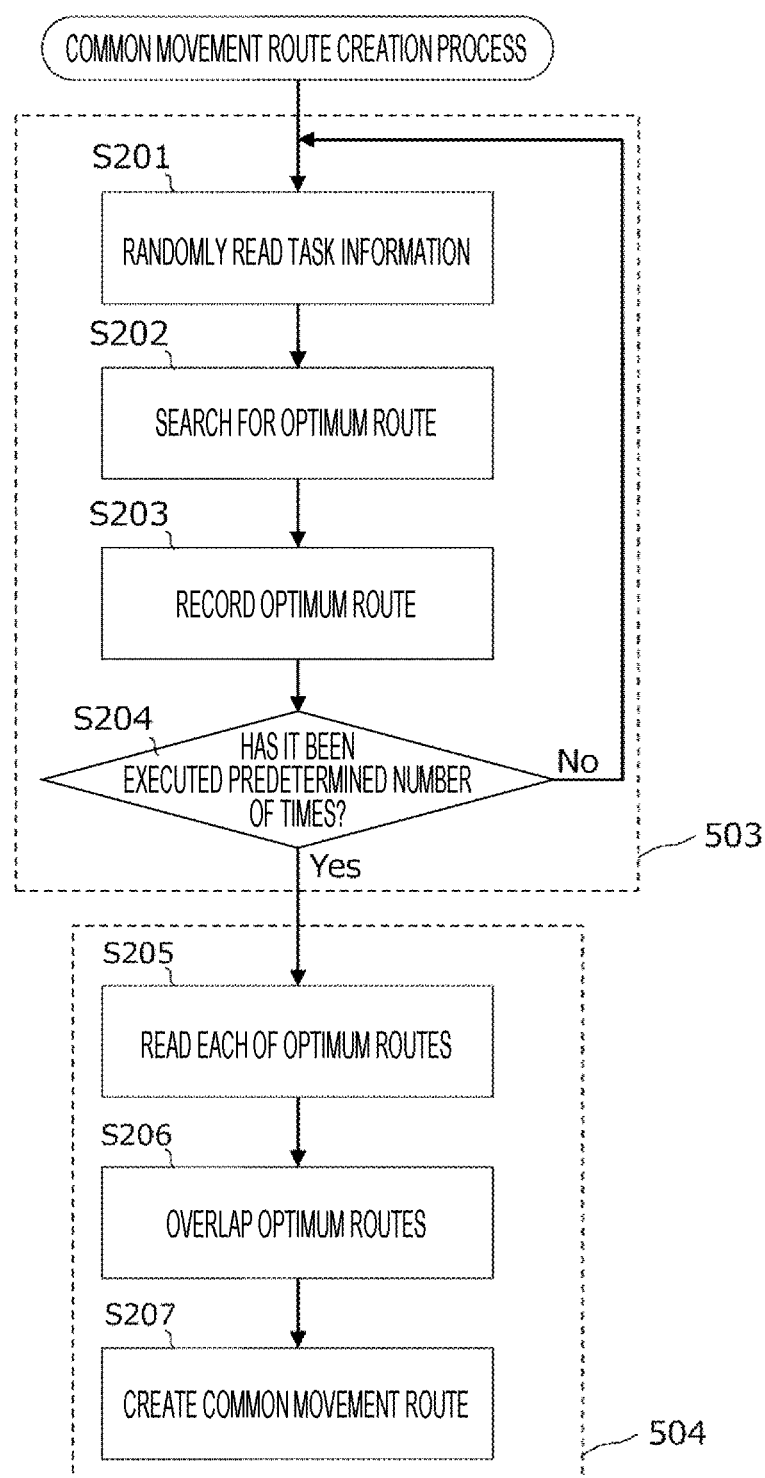
FIG. 7 is a flowchart illustrating a common movement route creation process in each embodiment.

Next, FIG. 7 is a flowchart illustrating a common movement route creation process executed after the process of FIG. 6. The process is performed at a predetermined time interval (e.g., once a day) that is longer than that of the moving body task recording process.

First, in step S201, the optimum route generation unit 503 randomly selects and reads one piece of the task information recorded in the storage area inside the computer for each of the moving bodies.

Next, in step S202, the optimum route generation unit 503 searches for the optimum route 542 of each of the moving bodies when moving body tasks as many as the number of the moving bodies are executed in parallel. Here, the optimum route 542 is a route that minimizes the task completion time and minimizes the number of approaches between the moving bodies, and can be searched using a machine learning method, for example, Q-learning or the like. Note that the present embodiment is not limited to the optimum route 542, and any individual route of each of the moving bodies satisfying a predetermined condition or under a predetermined restriction may be used.

In addition, the present embodiment is not limited to the creation of the routes, and it is possible to create individual rules of the moving bodies related to movement. That is, the optimum route generation unit 503 can function as an individual rule generation unit. Further, the individual rules of the moving bodies related to the movement indicates settings, agreements, and standards of the systems related to the movement.

Next, in step S203, the optimum route generation unit 503 records the optimum route 542 of each of the moving bodies 1 obtained in step S202 in the storage area inside the computer 5 such as the auxiliary storage device 54.

Next, in step S204, the optimum route generation unit 503 determines whether steps S201 to S203 have been executed a predetermined number of times. In this step, the number of times of searching for the optimum routes in step S202 may be determined. As a result, when it is determined that the number of times of execution is less than the predetermined number of times (No), the process returns to step S201 and is repeated for another task information. In addition, in a case where it is determined that the number of times of execution is equal to or more than the predetermined number of times (Yes), the process proceeds to step S205.

Note that the predetermined number of times used in step S204 varies depending on the number and types of recorded tasks, the number of moving bodies, and the like, but is desirably a number of times sufficient to select tasks of various combinations, for example, 1,000 times, 10,000 times, or the like. For this purpose, the computer 5 desirably stores this number of times in the auxiliary storage device 54 in advance to use this.

Next, in step S205, the common movement route creation unit 504 reads the optimum routes 542 recorded in step S203.

Next, in step S206, the common movement route creation unit 504 makes the read optimum route 542 overlap with each other. That is, the common movement route creation unit 504 overlaps the optimum routes 542.

Finally, in step S207, the common movement route creation unit 504 deletes a route in which the number of overlaps is less than a predetermined number, and creates the common movement route 543 based on the remaining routes. A route in which the number of overlaps is equal to or more than the predetermined number is extracted out of routes of either the truck loading and unloading system A or the warehouse management system B, and the common movement route 543 is created based on the extracted route. Then, the common movement route creation unit 504 creates the common movement route 543 by adding a route that complements a route for achieving a moving body task of the deleted route. Note that this complementation also includes diverting the deleted route. Further, the extracted route may be used directly as the common movement route.

In this manner, the common movement route creation unit 504 extracts the route in which the number of overlaps is equal to or more than the predetermined number as at least a part of the common movement route 543. In addition, the number of overlapping grids is used as the number of overlaps in the example of FIG. 3.

In this manner, the common movement route creation unit 504 creates the common movement route based on the number of overlaps as an example of an overlapping situation in the present embodiment. The overlapping situation includes the presence or absence of an overlap at a predetermined position (for example, an important position) in the common area as well as the number of overlaps.

Further, the overlapping situation is used in the present embodiment, but the overlapping situation includes a collision situation that is a situation such as a collision between the moving bodies or an approach satisfying a predetermined condition in the case of movement according to individual rules. Here, the approach satisfying the predetermined condition includes a distance between the moving bodies being equal to or less than a predetermined value, and a change in a movement situation such as deceleration or direction change of at least one of the moving bodies. Note that the collision situation includes the number of collisions and the presence or absence of a collision at a predetermined position (for example, an important position) in the common area.

Through the above processing, the common movement route 543 for the plurality of moving bodies as in the example illustrated in FIG. 3 can be created.

Note that the common movement route creation unit 504 is not limited to the creation of the common movement route 543, and can create a common area rule related to movement. That is, the common movement route creation unit 504 can function as a common area rule creation unit.

The common movement route 543 created in this manner is transmitted to the management servers (601 and 602) of the respective systems via the communication I/F 52. In the management servers 601 and 602 that have received this, the common movement route 543 is used as a route map that can be set at the time of planning global movement routes. That is, the global movement routes planned by the management servers 601 and 602 are planned along the common movement route 543. Note that the management servers (601 and 602) desirably store the global movement routes although not illustrated in FIG. 12.

In addition, the management servers (601 and 602) transmit the global movement routes to the moving bodies 1.

Then, the unmanned machine 1a plans a local movement route along the global movement route to autonomously move, and guidance is displayed as a reference route to urge the manned machine 1*b* and the worker 1*c* to move along the global movement route.

In this manner, when behaviors of the truck loading and unloading system A and the warehouse management system B are planned according to the common rule which is the common movement route, the flow of movement of the plurality of moving bodies 1 becomes smooth, and the risk of the approach and collision is reduced. Further, since the movement of the moving body of the other system can be easily predicted by the common movement route, there are fewer scenes where deceleration or stop due to the approach of the moving bodies 1, and as a result, an average moving body task completion time of each of the moving bodies 1 is shortened.

Figures 8, 9:
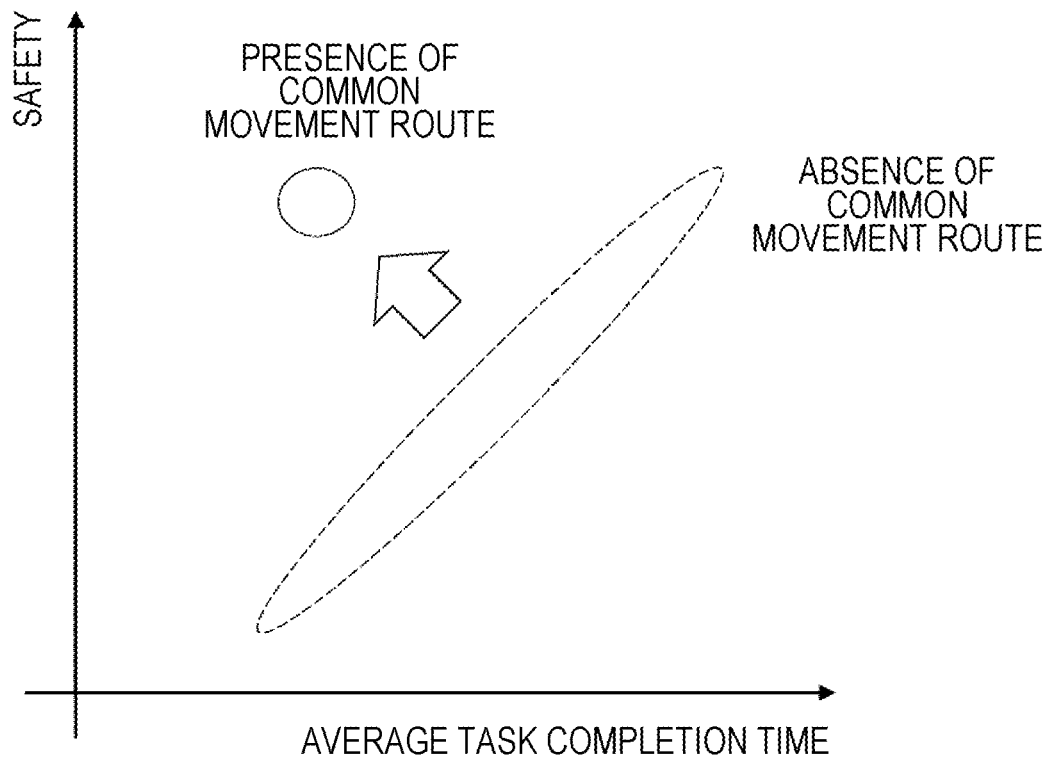
FIG. 8 is a view for describing effects in the first embodiment.
FIG. 9 is a view illustrating a moving body task in a second embodiment.

Effects of the present embodiment are illustrated in FIG. 8. In a case where the common movement route 543 is not used, the safety and the efficiency (task completion time) are in a trade-off relationship, so that the safety decreases with an increase in a risk of contact between the moving bodies when the efficiency is obtained. In this case, when the safety is obtained, the task completion time is extended with a deceleration of the moving body and an increase in the number of stops. On the other hand, in a case where the common movement route is used, the task completion time can be shortened while maintaining the safety, and both the safety and the efficiency can be achieved.

In addition, the optimum route is searched for based on an actual moving body task in the present embodiment.

For this reason, the start point and the goal point of the moving body task 541 are the same as those of the actual task, and the movement route therebetween is optimized in the present embodiment.

Note that it is highly likely to obtain the overall optimum by changing the start point and the goal point more dynamically, but the operation of each of the moving bodies 1 changes greatly as a result. For this reason, there is a risk that the base rule of each pf the systems is significantly changed inside and outside the common area. On the other hand, the common movement route 543, which is the common rule for taking the sum of the base rules of the respective systems with respect, is created in the present embodiment. That is, the safety and the efficiency can be optimized without changing the behavior of each of the systems as much as possible on the present embodiment, rather than aiming at the overall optimization. The description of the first embodiment has ended as above.

Second Embodiment

Hereinafter, the second embodiment of the present invention will be described. The second embodiment is different from the first embodiment in terms of the moving body task 541 (a moving body task 541' n the present embodiment). FIG. 9 illustrates the moving body task 541' in the second embodiment. The moving body task 541 of the first embodiment is represented only by the start point and the goal point. On the other hand, in the second embodiment not only a start point and a goal point but also a movement history therebetween is also extracted as task information in step S106 as the moving body task 541'. That is, in step S106, the time-series moving body positions 544 are extracted respectively as pieces of the task information.

In addition, in step S202, the optimum route generation unit 503 searches for an optimum route that minimizes the amount of change from a movement history of an actual task in addition to the conditions of the optimum route of the first embodiment.

In this manner, the obtained common movement route 543 further reflects a base rule of each system in the second embodiment, which is more effective when it is desired to suppress a width of change of the rule. For example, when it is desired to fit a rule of the warehouse management system B without changing a rule of the truck loading and unloading system A as much as possible, the task information (each movement history) of the second embodiment is used only for the moving body 1 of the truck loading and unloading system A. As a result, the moving body 1 of the warehouse management system B can create the desired common movement route 543 using the task information (the start point and the goal point) of the first embodiment. The description of the second embodiment has ended as above.

Third Embodiment

Next, the third embodiment of the present invention will be described. The third embodiment assumes a scene where construction is performed by a construction machine, which is the moving body 1, on a part of a road on which an automobile which is also the moving body 1 travels. The processing content of the present embodiment is the same as that of the first embodiment or the second embodiment, and the common area 2 that is an application destination environment is different.

Figure 10:
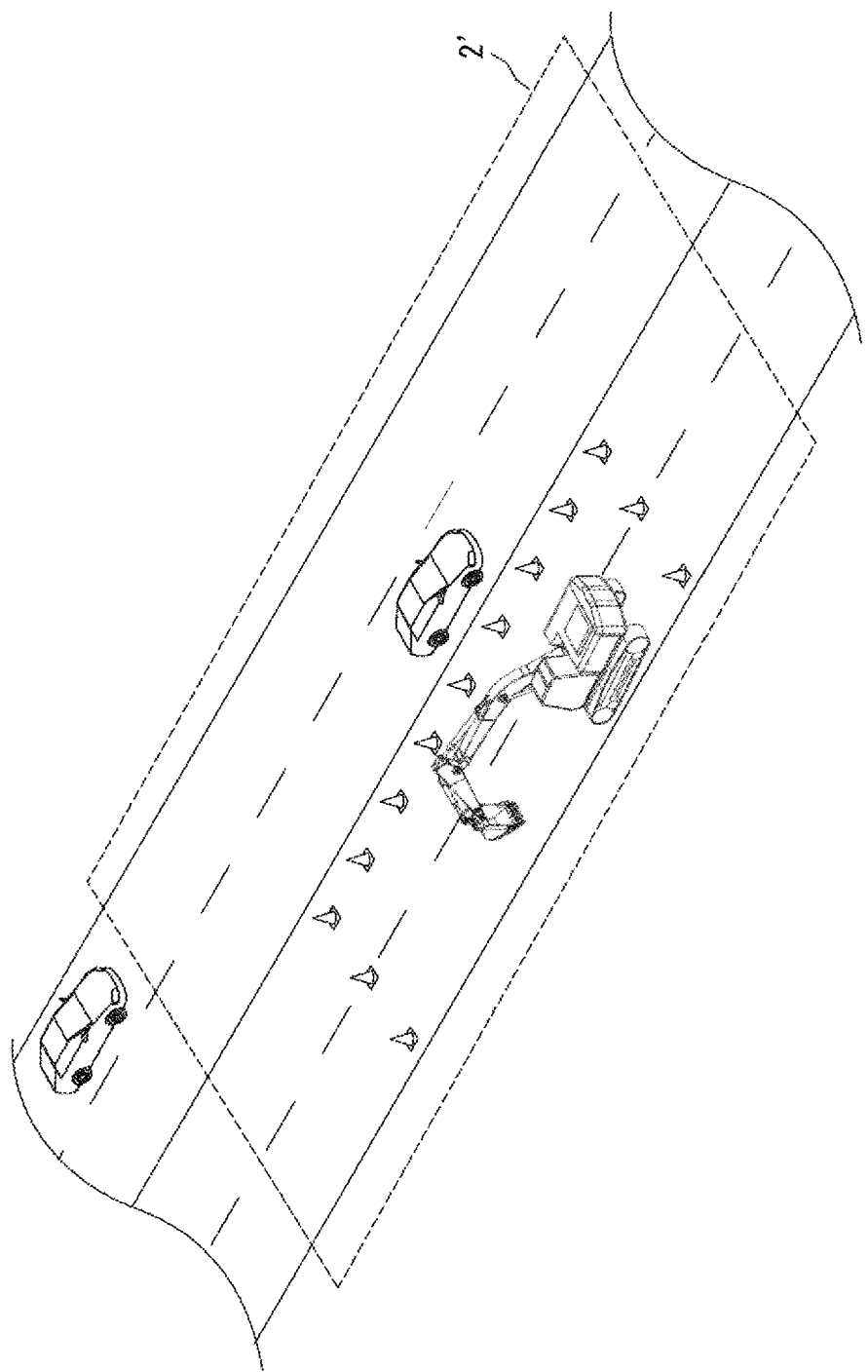

FIG. 10 is an overall view of the control system for a plurality of moving bodies according to the third embodiment. In FIG. 10, construction is performed by a construction machine or a surrounding worker so as to block one side of a road having two lanes on each side included in a common area 2'. Here, the construction machine, the surrounding worker, and automobiles traveling on an opposite lane correspond to the moving bodies 1. FIG. 11 illustrates rules in a plurality of systems and a concept of a common movement route in a case where the present embodiment is applied to such an environment.

First, a system including a group of automobiles driven by persons is referred to as a system C. The system C behaves using a traffic rule set at the place as a base rule. In addition, the moving bodies 1 in the system C is connected to the management server 601. It is assumed that a global movement route is transmitted from the management server 601 to these moving bodies 1, and automated driving, automatic assist driving, or manual driving by an operator is performed. Note that each of the moving bodies 1 in the system C may be autonomously controlled. That is, the management server 601 may be omitted. In addition, the environment sensor 3 may be installed on the moving body 1 or may be installed on a road.

In addition, a system including a construction machine operated by an operator is referred to as a system D. The construction machine performs construction such as excavation while sequentially moving according to a construction plan, and a rule related to the construction plan or work safety of a site or the like is a base rule. A movement route of each of the moving bodies 1 (the automobiles in the system C and the construction machine or a worker in the system D) in the independent system based on the base rule of each of the systems is as illustrated in FIGS. 11(*a*) and 11(*b*).

Note that a movement route of the system C when a lane has been changed is omitted in FIG. 11. In a case where the moving bodies 1 in the systems C and D operate in parallel in the common area 2', the moving body 1 of the other system is not allowed to travel in two lanes on each side due to the construction machine or the surrounding worker which is the moving body 1 in the system D. For this reason, the automobile which is the moving body 1 in the system C continues to stop while the moving body 1 (automobile) traveling in an opposite lane to a lane in which the construction machine and the surrounding worker are present is being stopped.

Then, when there is no moving body traveling in the opposite lane, the moving body 1 in the system C overtakes the moving body 1 in the system D using the opposite lane. In a case where traffic volumes of both the lanes are substantially the same, there is a high possibility that a traffic jam occurs on one side and a task completion time is extended.

When the present invention is applied to the common area 2' in such an environment, for example, the computer 5 creates the common movement route 543 as illustrated in FIG. 11(c). Then, the moving body 1 in the system C is autonomously controlled based on the common movement route 543. Alternatively, a display device of the moving body 1 displays a guidance. This optimizes the safety and the efficiency in the common area 2'.

The description of each of the embodiments of the present invention has ended as above. Note that the moving bodies in each of the embodiments include so-called robots in addition to the above-described automated driving automobile (including automated driving assistance vehicle) and a forklift. The robots include a security robot and a guidance robot in facilities such as buildings, stations, and airports. Further, the automated driving automobile includes so-called in-line travel such as a truck and a bus.

REFERENCE SIGNS LIST 1 moving body
1a unmanned machine
1b manned machine
1c worker
2 common area
3 environment sensor
4 network 4
5 computer
501 moving body task estimation unit
502 moving body task recording unit
503 optimum route generation unit
504 common movement route creation unit
601 management server
602 management server

The invention claimed is:

1. A movement control support device that supports control of movement of moving bodies in a common area that move according to control by separate and independent systems, the movement control support device comprising:
a processor coupled to a first server controlling movement of one of the movement bodies in one of the separate and independent systems, and coupled to a second server controlling movement of another one of the movement bodies in another one of the separate and independent systems; and
a memory storing instructions, that when executed by the processor, configures the processor to:
estimate moving body tasks of the moving bodies based on respective movement positions of each of the moving bodies respectively controlled by the first server and the second server,
generate individual rules indicating individual routes of movement for realizing the moving body tasks for each of the moving body tasks,
overlap the generated individual routes of the moving bodies and delete one or more individual routes in which a number of overlaps is less than a predetermined number, which is greater than one, and extract one or more individual routes in which the number of overlaps is equal to or more than the predetermined number, and
create a common area rule of the movement of the moving bodies in the common area using each of the extracted individual routes, the common area rule indicating a common route of the moving bodies.

2. The movement control support device according to claim 1,
wherein the processor is configured to generate the individual routes for each moving body based on an optimized route for completing each moving body task.

3. The movement control support device according to claim 1,
wherein the processor is configured to use, as the number of overlaps, a number of grids in which the individual routes overlap with each other out of grids that divide the common area into a lattice shape.

4. The movement control support device according to claim 1,
wherein the moving body task is defined by task information including a start position, an arrival position, and a movement history between the start position and the arrival position of the moving body.

5. The movement control support device according to claim 4,
wherein the processor is configured to generate an individual route that minimizes an amount of change in the movement history.

6. A movement control support method using a movement control support device, which supports control of movement of moving bodies in a common area that move according to control by separate and independent systems, the movement control support method comprising,
by the movement control support device:
coupling to a first server controlling movement of one of the movement bodies in one of the separate and independent systems, and coupling to a second server controlling movement of another one of the movement bodies in another one of the separate and independent systems;
receiving movement positions of each of the moving bodies;
estimating moving body tasks of the moving bodies based on respective movement positions;
generating individual rules indicating individual routes of movement for realizing the moving body tasks for each of the moving body tasks;
overlapping the generated individual routes of the moving bodies and delete one or more individual routes in which a number of overlaps is less than a predetermined number, which is greater than one, and extract one or more individual routes in which the number of overlaps is equal to or more than the predetermined number;

creating a common area rule of the movement of the moving bodies in the common area using each of the extracted individual routes rules, the common area rule indicating a common route of the moving bodies;

transmitting the common area to each of the first server and the second server in the plurality of systems;

transmitting pieces of information for controlling movement in the common area to the moving bodies from each of the first server and the second server; and enabling the moving bodies to move in the common area based on pieces of the information for controlling the movement.

7. The movement control support method according to claim 6, further comprising:

determining, the individual routes for each moving body based on an optimized route for completing each moving body task.

8. The movement control support method according to claim 7, wherein in creating the common area rule, a number of grids in which the individual routes overlap with each other is used, as the number of overlaps, out of grids that divide the common area into a lattice shape.

9. The movement control support method according to claim 6, wherein the moving body task is defined by task information including a start position, an arrival position, and a movement history between the start position and the arrival position of the moving body.

10. The movement control support method according to claim 9, wherein in generating the individual rule, an individual route that minimizes an amount of change in the movement history is generated.

* * * * *